United States Patent Office 3,297,873
Patented Jan. 10, 1967

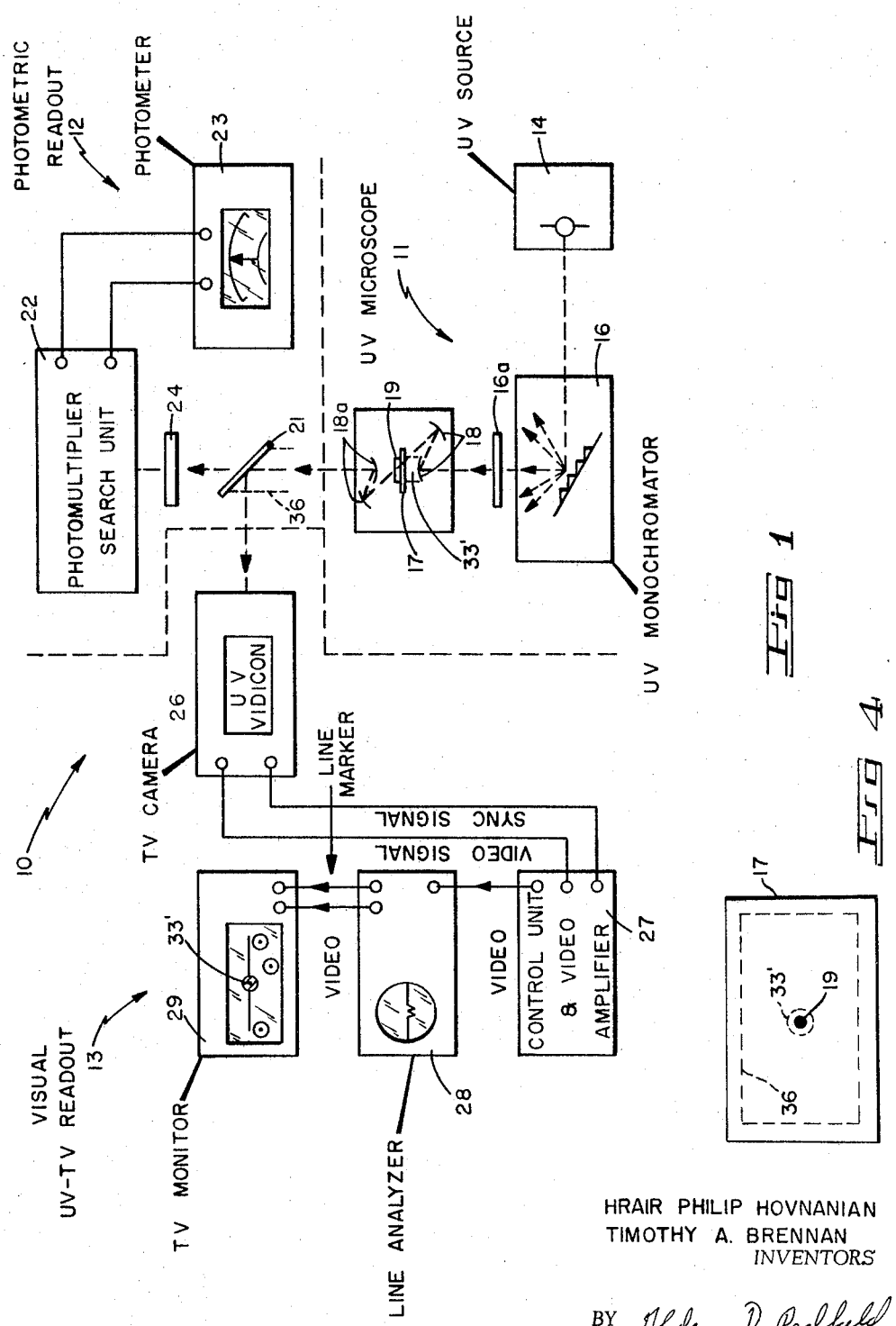

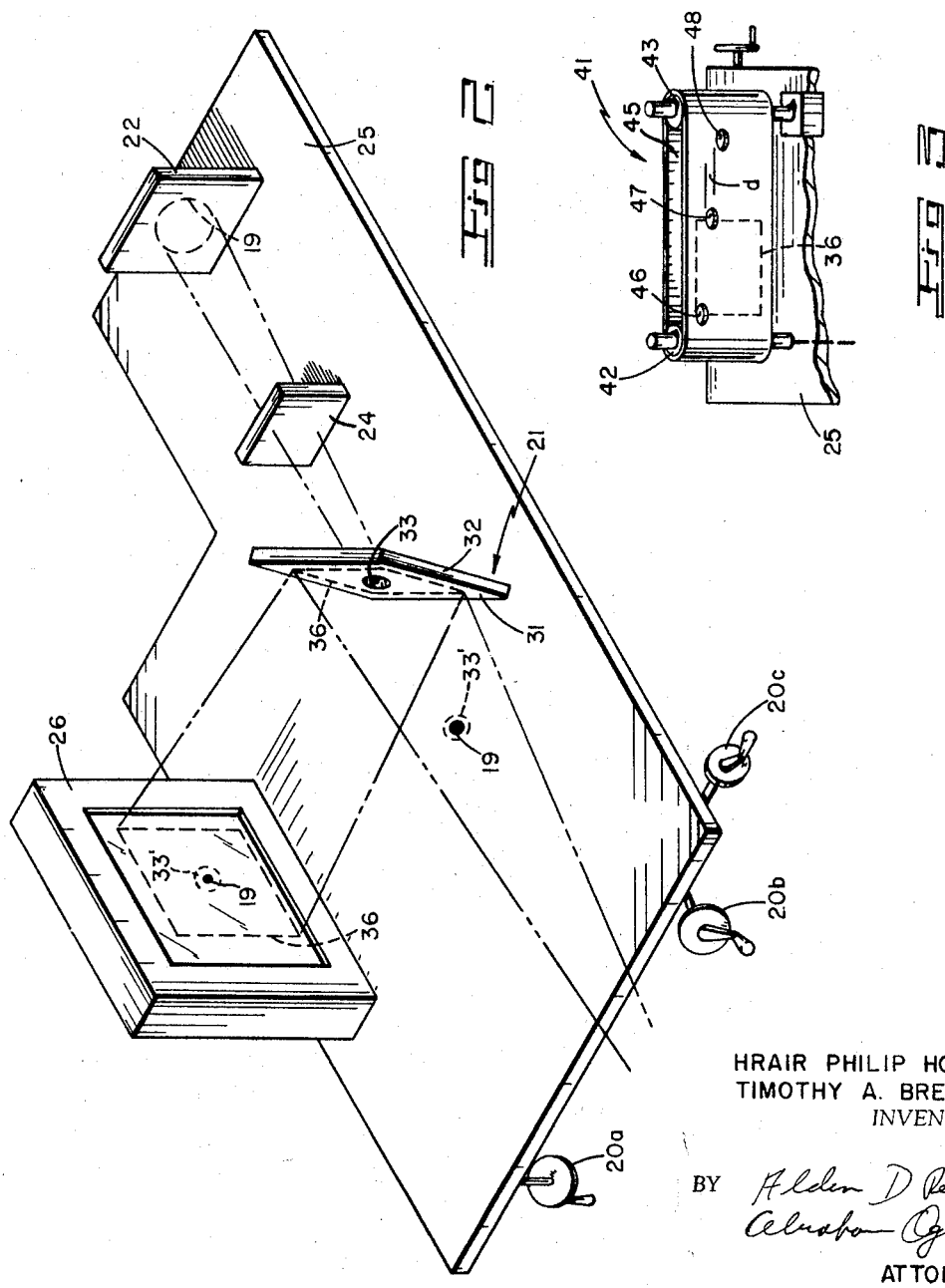

3,297,873
MICROSCOPE SYSTEM WITH MEANS FOR VIEWING THE ENTIRE IMAGE AND MEANS FOR MEASURING RADIATION FROM A SELECTED SEGMENT OF IMAGE
Hrair Philip Hovnanian, Winchester, and Timothy A. Brennan, Andover, Mass., assignors to Avco Corporation, Cincinnati, Ohio, a corporation of Delaware
Filed Dec. 30, 1963, Ser. No. 334,320
10 Claims. (Cl. 250—71)

This invention is directed to microscope systems, and in particular to a microscope system which provides synchronized, visual and quantitative readouts.

The invention described herein can be used in many applications using visible or invisible light. It is designed primarily for use with ultraviolet (UV) light as microspectrophotometer or a fluorescent microscope, both of the foregoing applications being generally used with immunofluorescence antibody-antigen and microorganism type specimens. Thus, while the following discussion will deal largely with the UV applications, these will be by way of illustration and not limitation.

Prior art microspectrophotometers and fluorescent microscopes utilize a visual readout comprising an eye piece or an image converting tube such as a television monitoring system having a UV vidicon and a conventional monitor. Both of the foregoing visual readout techniques are quantitatively inaccurate. When an eye piece is used, quantitative information relies on the subjective visual impressions of the individual observer. Not only can these readings vary with the observer, but they are also known to vary over wide limits when examined by a single observer.

The TV monitoring system is also not reliable as a quantitative device since readings are a function of the calibrations of the electronic circuits, and these are known to vary, as well as being non-linear. To increase the accuracy in TV readouts, a line analyzer has been used with a TV monitoring system. A specimen or a part of the specimen is selected by the horizontal line analyzer and the analogue of the specimen's line intensity appears on the line analyzer oscilloscope. The amplitude of the analogue system is used to represent the light variation relating to the specimen. This technique is inaccurate because (1) the electronic systems implicated are not linear devices, and their gains vary, and (2) most of the image converting or TV systems include control circuits which tend to reduce high-intensity signals which would correspond to high-intensity light and magnify low-intensity light in order to maintain a level within the dynamic range of the display and associated circuitry.

It is an object of the invention to provide a microscope system which avoids the limitations and disadvantages of prior art systems.

It is another object of this invention to provide a microscope system including synchronized, quantitative and visual readout.

It is another object of the invention to provide a microscope system which is easily adapted to function as a microspectrophotometer or a fluorescent microscope.

It is yet another object of the invention to provide a microscope system which includes means for selecting a specific specimen or a specific part of a specimen and includes means for obtaining an accurate, quantitative and visual readout of specific points of interest.

It is still another object of the invention to provide a microscope having synchronized, quantitative and visual readouts which can be easily adapted to function with visible or invisible applied radiation in various wave bands.

It is yet another object of the invention to provide a microscope system including an improved specimen scanning device.

It is still another object of the invention to provide a microscope system including an automatic specimen scanning system.

In accordance with the invention, a microscope system comprises an illuminated microscope including a predetermined and fixed area in or near the final image plane and hence the focal plane. The microscope also includes means for providing a second area in the image and hence focal plane contained within the aforementioned fixed area for imaging purposes. The microscope also includes means for placing a specimen holder in the focal plane.

The microscope system also includes means for providing a quantitative readout of the intensity of light received from the aforementioned second area and means for visually displaying at the fixed area. Preferably, the microscope system also includes means for positioning specimens, or portions of specimens, within the second area so that they may be observed. The positioning means may include an automatic scanning device.

The novel features that are considered characteristic of the invention are set forth in the appended claims; the invention itself, however, both as to its organization and method of operation, together with additional objects and advantages thereof, will best be understood from the following description of a specific embodiment, when read in conjunction with the accompanying drawings, in which:

FIGURE 1 is a block representation of a microscope system embodying the principles of the present invention;

FIGURE 2 is an enlarged schematic representation of the photometric readout used in the FIGURE 1 system, including one scanning technique;

FIGURE 3 is a schematic representation of an alternate scanning technique; and

FIGURE 4 is an enlarged top view of the specimen holder.

Referring to FIGURE 1 of the drawing, there is depicted a microscope system 10 embodying the principles of the present invention. The microscope system 10 includes three major components: a microscope 11 which for purposes of illustration uses UV light; a quantitative readout depicted as a photometric readout 12; and a visual display depicted as a visual UV-TV readout 13.

The microscope 11 includes an illuminator 14 shown in FIGURE 1 as a UV light source. The light from the illuminator 14 is applied to a UV monochromator 16 which acts as a variable filter for selecting and transmitting UV light having a specific and desired frequency or frequencies. The monochromator 16 makes it possible to apply to the specimen UV light of selected frequencies. A primary filter 16a blocks off any undesired wavelengths especially in the fluorescence emission range. The microscope 11 also includes lensing systems 18 and 18a for applying light to the specimen 19 and magnifying the light image received from the specimen 19 respectively.

The photometric readout 12 includes a mirror 21, a photomultiplier search unit 22 which is optically coupled to the mirror 21, and a photometer 23 which is electrically coupled to the output of the photomultiplier search unit 22.

The photomultiplier search unit is of conventional design and function in that it receives light energy either in the visible or invisible range and converts the light image into an electrical signal, the amplitude of which is an accurate function of the light intensity. The photometer 23 displays the magnitude of the electrical signal it receives from the photomultiplier search unit 22. As is well known, photometric systems are accurate and stable.

A secondary filter 24 is provided in the optical path between the mirror 21 and the photomultiplier search unit 22. The secondary filter 24 is not used when the microscope system is being used as a transmission or absorption microspectrophotometer. It is used when the microscope system 10 is used as a fluorescent microscope. The secondary filter 24 blocks the transmittal of illuminating UV or irradiating light from reaching the photomultiplier search unit 22 but passes visible or fluorescence emission light to the photomultiplier search unit 22.

The third major subassembly of the microscope system is the visual readout 13. In FIGURE 1 there is illustrated a more or less conventional UV vidicon and TV monitoring system comprising a TV camera 26, a control unit and video amplifier 27, a horizontal line analyzer 28, and a TV monitor 29. In the alternative, it is quite obvious that a pure optical display may be used in place of the TV system. In fact, the visual readout 13 may be an eye piece for fluorescence microscopy to which may be added an image converter for converting the invisible light energy to visible image for invisible light microscopy.

FIGURE 2 depicts an enlarged representation of the mirror 21, the secondary filter 24, and the photomultiplier search unit 22.

It will be noted that the mirror 21, the secondary filter 24, the photomultiplier search unit 22 and TV camera 26 are mechanically ganged, mounted to a platform 25, so that they are moved together to maintain the optical alignment of these components.

A significant feature of this invention is the use of the mirror 21 as a scanning device. Because the image on the mirror is highly magnified, a microscopic movement of the specimen holder is reflected on the holder as a macroscopic movement. For example, if the specimen holder is moved one micron, the image on the mirror 21 can be made to move—depending on the magnification—about a quarter inch. Thus, by using the mirror as a scanning device, relatively inexpensive mechanical adjusting means, such as the lead screws 20a, 20b and 20c, designed to move platform 25 in three orthogonal directions, can be used, whereas it is obvious that highly accurate and prohibitively expensive adjusting means is required if the specimen holder is moved, in view of the microscopic nature of the specimens.

Additionally, since the magnification of an image on the mirror is a function of the distance between the mirror and the specimen holder, it is clear from FIGURE 2 that it is possible to locate the mirror 21 so that the image of the specimen 19 fills up at least 65 percent of the aperture 33 by moving platform 25 toward and away from the specimen holder. See phantom aperture 33'. By utilizing at least 65 percent of the area of aperture 33, the effects of background light is reduced to a negligible amount. In other words, the quantitative readings are made to represent the magnitude of light received from the specimen 19, exclusive of ambient effects.

Mirror 21 is, preferably, a front-faced mirror. If UV transmissive quartz or similar back-faced mirror were used, the possibility of a double image exists, namely reflections from front and back surfaces. Accordingly, mirror 21 includes a front reflective surface 31 applied to a back-up structure 32. In the alternative, mirror 21 may comprise a highly polished metallic surface.

The mirror 21 also includes an aperture 33 which is positioned and oriented to pass light energy from a specific area in the focal plane of the system such as the area 33' shown in the specimen holder 17 of FIGURE 4.

As a fluorescent microscope, light from the illuminator 14 is applied to the monochromator 16 where a specific frequency band of light is selected. The selected light frequency band is then applied to the specimen holder 17 through primary filter 16a where it is directed by condenser 18 through the specimen 19 and magnified and imaged by the lensing system 18a.

Typically an area 36 on the specimen holder 17, also shown on the mirror 21, is illuminated. In other words, the area 33', within the larger illuminated area 36 on the specimen holder 17, as shown in FIGURE 4, represents a second area which is defined by that portion of the light emitted from area 36 which passes through the aperture 33 on the mirror 21. Light within area 36 is reflected to the TV camera 26 and will include an image of the aperture 33. Light leaving area 33' passes through the aperture 33 to the secondary filter 24. Depending on magnification characteristics of the microscope optics, the aperture 33 relates to small specimen sampling area 33' in a ratio proportional to the magnification used.

For scanning the area 36, the specimen holder 17 can be provided with a multitraverse screw mechanism (not shown), such as is typically used in microscopes.

A far more satisfactory scanning procedure was previously described whereby the mirror is moved in relation to the specimen holder to obtain a visual and quantitative readout of a specified portion of the area 36.

Scanning can also be automated. A preferred automatic scanning technique is illustrated in FIGURE 3, wherein an endless belt 41 is mounted on a pair of rollers 42 and 43. One of the rollers, 42 for example, is coupled to a motor (not shown) which rotates roller 42 and, consequently, rotates the endless belt 41. The surface 44 of the endless belt 41 is highly polished to a mirror finish. The endless belt 41 includes a number of apertures 46, 47 and 48 which accomplish the required scanning of the specimen holder 17.

The width of the endless belt 41 corresponds to one peripheral dimension of area 36 and the circumferential distance between apertures corresponds to the other peripheral dimension of area 36. The apertures are displaced along the width of the endless belt 41 by a distance "d" equal to the diameter of the apertures. Obviously, in this case the photomultiplier search unit 22 and the filter 24 will be positioned in the space 45 between opposing portions of the endless belt 41.

As the belt rotates, aperture 46 will scan an area immediately adjacent to the upper marginal edge of area 36. When aperture 46 reaches the location indicated in FIGURE 3, aperture 47 begins to scan a segment of area 36 parallel to its upper marginal edge, but removed from said edge by a distance "d," or the diameter of aperture 46. The endless belt 47 includes sufficient apertures spaced in the manner indicated above so that the entire area 36 is scanned during one revolution of the endless belt 41.

It is presumed in the foregoing that the photomultiplier search unit 22 is sensitive to any light received from the total area 36. It is clear, however, that at any instant it receives and records light being transmitted by one of the apertures from a specific location in area 36.

The secondary filter 24 blocks illuminating UV or irradiating light from reaching the photomultiplier search unit 22 but permits visible light such as is generated by a fluorescing specimen to pass through to the photomultiplier search unit 22. The visible light is converted into an electrical signal which is applied to the photometer 23 read out as an accurate quantitative value of the visible light intensity.

The secondary filter 24 is not placed ahead of mirror 21 since TV vidicons are not sensitive enough to pick up and amplify fluorescence emission light in the intensities generated in these systems. A TV image orthicon, although highly sensitive, will not provide suitable definition. Additionally, with fluorescence quantiative readout, simultaneous UV microscopy is made possible with quantitative fluorescence microscopy.

The image of area 36 upon reaching the TV camera 26 where it is designated by the number 36' is converted by conventional TV circuitry to electrical signals by the TV camera. The electrical signals are amplified by the control unit and video amplifier 27 and finally reconverted to a visual representation of the TV monitor 29. In FIGURE 1 a line analyzer 28 is shown between the control unit and video amplifier 27 and the TV monitor 29. As will be seen, the line analyzer 28 is provided merely for purposes of convenience for displaying an absorption or transmission profile of a specimen or a specific part of a specimen.

It is also noted that the schematic representation of the display includes a darkened area 33', as well as the display of area 36. This darkened area represents the displayed image of the aperture 33, and hence, the micro-sampled portion of specimen.

The purpose of the photometric microspectrophotometer is to determine the UV adsorption or transmission characteristics of microorganisms, cells and other microspecimens. UV adsorption is measured by placing one or more specimens on the specimen holder. The transmitted light intensity is measured by reading the photometer 23 without a specimen in the area 33'. Subsequent readings are taken by placing a specimen within the area 33' and noting the decrease in intensity on the photometer. Typically, the adsorption characteristics over a range of UV frequencies are obtained with each specimen. Because the visual readout 13 is synchronized with the photometric readout 12, a positive identification of each specimen whose absorption characteristic is being observed can be made. It is obvious from the foregoing that the secondary filter 24 is removed from the optical path between the mirror 21 and the photomultiplier search unit 22 and a UV sensitive photomultiplier is used.

As a fluorescent microscope, the secondary filter 24 is set in the optical bath between the mirror 21 and the photomultiplier search unit 22. Thus, the light from a fluorescing specimen, both UV and visible light, passes through the mirror 21 to the secondary filter 24. The secondary filter blocks the UV light and passes only visible light to the photomultiplier search unit 22, where the intensity of the visible light is measured and recorded. The light, both UV and visible, reflected from area 36 on the mirror 21 passes to the visual readout system 13 where it is converted to a visual display. Either the visible light or UV can be displayed by choosing a suitable illuminating wave band. Specimens falling within the area 33' on the TV monitor 29 serve to identify and correlate the photometric readings with a specific specimen or a specific part of a specimen.

The various features and advantages of the invention are thought to be clear from the foregoing description. Various other features and advantages not specifically enumerated with undoubtedly occur to those versed in the art, as likewise will many variations and modifications of the preferred embodiment illustrated, all of which may be achieved without departing from the spirit and scope of the invention as defined by the following claims.

We claim:
1. A microscope system comprising:
(a) a microscope including a focal plane, means for placing a specimen holder in the focal plane, means for illuminating the focal plane with radiation, and means for projecting radiation passing from said focal plane for forming an image of said focal plane;
(b) a mirror for receiving and reflecting said image, said mirror including an aperture through which radiation from a selected portion of said focal plane passes;
(c) readout means for providing a quantitative readout of the radiation intensity passing through said aperture;
(d) means for visually displaying the reflected image of said focal plane, including an image of said aperture; and
(e) means for providing relative movement between said aperture and said focal plane whereby the former scans the latter.

2. A microscope systems as described in claim 1 which includes in addition means for adjusting the size of the portion of the focal plane passing radiation through said aperture.

3. A microscope system as described in claim 2 which includes in addition means for moving said mirror toward and away from said focal plane for varying the area of the focal plane transmitting light through said aperture.

4. A microscope system as described in claim 1 which said scanning means comprises an endless rotatable belt having laterally and circumferentially displaced apertures.

5. A microscope system as described in claim 4 in which said apertures are laterally displaced by a distance equal to their diameter, and circumferentially displaced to sequentially scan adjacent segments of the focal plane.

6. A fluorescent microscope system for viewing specimens which convert invisible radiation to visible radiation, comprising;
(a) a microscope including a focal plane, means for placing a specimen holder in the focal plane, means for illuminating the focal plane with radiation, and means for projecting radiation passing through said focal plane for forming an image of said focal plane;
(b) a mirror for receiving and reflecting said image, said mirror including an aperture through which visible radiation from a selected portion of said focal plane passes;
(c) readout means for providing a quantitative readout of the visible radiation intensity passing through said aperture;
(d) means for visually displaying the reflected image of said focal plane including an image of said aperture; and
(e) scanning means for selecting successive portions of said focal plane from which visible light is in optical communication with said aperture.

7. In a fluorescent microscope as described in claim 6 in which said mirror may be moved toward or away from said focal plane for enlarging or diminishing the area of the focal plane from which radiation is transmitted through said aperture.

8. A fluorescent microscope as described in claim 6 in which said mirror is an endless rotatable belt containing laterally and circumferentially displaced apertures, said apertures being laterally displaced by a distance equal to their diameter, and circumferentially displaced to sequentially scan adjacent segments of said focal plane.

9. A microscope system comprising;
(a) a microscope for providing an image of radiation projected from its focal plane, said microscope includes means for illuminating the focal plane with radiation,
(b) readout means optically coupled to a selected segment of the focal plane for providing a quantitive readout of radiation intesity emitted from said selected segment, and
(c) means for receiving and visually displaying radiation projected from the entire focal plane, inculding said segment.

10. A microscope system as defined in claim 9, which includes in addition means for adjusting the optical coupling between said readout means and said focal plane for optically coupling said readout means to a selected segment within the focal plane.

References Cited by the Examiner

UNITED STATES PATENTS

| | | | |
|---|---|---|---|
| Re. 25,118 | 1/1962 | Graves | 250—65 X |
| 2,184,159 | 12/1939 | Stockbarger et al. | 250—235 X |
| 2,730,566 | 1/1956 | Bartow et al. | 250—71 X |
| 2,838,678 | 6/1958 | Beese | 250—71 X |
| 2,848,624 | 8/1958 | Friedman et al. | 250—71.5 |
| 2,874,300 | 2/1959 | Van Alphen et al. | 250—65 |
| 2,913,584 | 11/1959 | Dill | 250—235 X |
| 2,968,729 | 1/1961 | Pepper et al. | 250—83.3 X |

RALPH G. NILSON, *Primary Examiner.*

W. F. LINDQUIST, *Assistant Examiner.*